United States Patent

[11] 3,630,759

[72] Inventor George G. Rumberger
 Portage, Mich.
[21] Appl. No. 376
[22] Filed Jan. 2, 1970
[45] Patented Dec. 28, 1971
[73] Assignee Brown Company
 Kalamazoo, Mich.
 Continuation-in-part of application Ser. No. 499,088, Oct. 20, 1965, now abandoned.
 This application Jan. 2, 1970, Ser. No. 376

[54] PACKAGE FOR RESPIRATORY PRODUCTS
 14 Claims, No Drawings

[52] U.S. Cl. .................................................... 99/171 LP,
 99/171 R, 99/171 PP, 99/189
[51] Int. Cl. ...................................................... B65b 25/04,
 B65b 31/00
[50] Field of Search ........................................... 99/171,
 189, 178, 174

[56] References Cited
 UNITED STATES PATENTS
 3,248,040 4/1966 Friedman .................. 99/171 X

OTHER REFERENCES

Gerhardt et al. " Modern Packaging" June 1948, Pages 163–165

Landrock et al. " Tappi" Vol. 35, June 1952, pages 241–246

*Primary Examiner*—Raymond N. Jones
*Attorneys*—Talivaldis Cepuritis and Gordon W. Hueschen ABSTRACT: Perishable plant foods are contained in a package comprising an inner pouch containing the plant food and an outer pouch enveloping the inner pouch and containing a gaseous atmosphere having an oxygen content less than about 15 percent by volume therebetween. The inner pouch is made of a material having a carbon dioxide to oxygen permeability ratio of at least 3:1, and the outer pouch is made of a material having both a carbon dioxide permeability and an oxygen permeability no greater than about one-fourth of the oxygen permeability of the inner pouch material.

PACKAGE FOR RESPIRATORY PRODUCTS

CROSS-REFERENCE TO RELATED APPLICATIONS

This application is a continuation-in-part of U.S. Ser. No. 499,088 filed on Oct. 20, 1965, now abandoned.

BACKGROUND OF THE INVENTION

The present invention relates to the packaging of perishable materials, and is more particularly concerned with a novel means for packaging perishable plant foods under controlled atmospheric conditions for distribution and sale of unitized items of the same.

It is well known that most if not all produce such as fruits and vegetables in the postharvest state consume oxygen and produce carbon dioxide and, at some postharvest state, generally reach which is known as a climacteric, or full degree of ripeness, at which time the production of carbon dioxide and consumption of oxygen reaches a maximum and thereafter gradually decreases. In the postclimacteric state, if the consumption of oxygen and evolution of carbon dioxide is not regulated, overripening and spoilage in the form of enzymatic changes, rotting, fungal growth, molding, and the like can occur, and hence a great proportion of produce reaching the final market is quite often in an unmarketable, or at least objectionable, state when it reaches the final customer or point of distribution.

Recently methods of controlling fruits and vegetables during their storage period in closed warehouses have been employed wherein the unpackaged produce stores in bulk form is exposed to an atmosphere high in carbon dioxide and deficient in oxygen, thereby delaying the overripening of the produce. Although this method has been quite feasible and successful in large bulk storage areas, it has been found that when the so stored produce is placed on the market, it soon begins to degrade in quality unless marketed immediately. Although packaging of produce in various moisture-vapor-proof films in recent years has precluded spoilage from drying out, it has been impossible to control the microclimate of the package in sufficient degree to prevent spoilage during distribution and marketing of fruits and vegetables.

It is an object of the invention to provide a package for preserving respiratory products such as plant produce contained therein to protect the produce during storage. It is a further object to provide such a package which additionally protects the produce during shipment and marketing subsequent to storage. It is still another object to provide a package of the type described which is inexpensive to produce and relatively simple to apply. Additional objects will become more fully apparent hereinafter and still others will be apparent to one skilled in the art.

SUMMARY OF THE INVENTION

According to the invention it has now been found that a package by which the desired objects are attained may be provided. The package comprises a film having certain characteristics, especially, certain gas permeability properties, which is utilized to form an inner sealed enclosure, and a second film having different permeability characteristics forming a secondary enclosure, a free gas spacing being enclosed at least between the first and second enclosures. When the properties of the film are suitably chosen, an atmosphere is formed within the inner film having an oxygen content reduced to a value at which deterioration due to excessive oxygen consumption no longer takes place, but still sufficient to prevent deterioration resulting from an abnormally low oxygen content. Further, when the relative permeability characteristics of the two-film materials is suitably chosen, the desirably low oxygen content is maintained over a sufficient length of time to permit the produce to be marketed and consumed.

DESCRIPTION OF THE PREFERRED EMBODIMENTS

Numerous investigators have measured the respiration rates of fruits and vegetables of different sorts, and in general it has been found that the consumption of oxygen and the production of carbon dioxide are almost equal at the climacteric state. These investigators have generally shown that if the relative amount of oxygen in the atmosphere surrounding the fruit or vegetable is reduced, spoilage may be delayed for a considerable length of time. However, it has also been found that complete exclusion of oxygen from most fruits and vegetables results in deterioration, and may be equally as injurious as high oxygen concentrations. According to the invention, a satisfactory equilibrium is attained by controlling the flow so that oxygen is not allowed to enter as fast as the product would normally consume it to produce an equal volume of carbon dioxide.

Table I below lists favorable climate compositions for proper preservation of various perishable plant foods, such as fruits and vegetables, determined from tests reported in Food and Food Products, by Morris B. Jacobs, Interscience Publishers, Second Edition, Volume 2, taken from Pages 1,285, 1,286, 1,325, 1,358, 1,415, 1,511, and 1,539. In each case the percentages of oxygen and carbon dioxide are indicated, the balance of the composition being nitrogen.

TABLE I

|  | Oxygen (Percent by volume) | Carbon dioxide (Percent by volume) |
| --- | --- | --- |
| Shelled peas | 3–5 | 30–50 |
| Potatoes | 10 | 20–30 |
| Cranberries | 10 | 10 |
| Oranges | 20–30 | 1 |
| Apples | 2–3 | 5 |
| Avocados | 2–3 | 6–7 |
| Bananas | Low | Low |

Heretofore it has been impossible to design a single packaging material, for example in the form of a film, which will suit all fruits and vegetables, and only temporary improvements in the microclimate of sealed packages have been attained. In many instances holes are provided in the film in order that the produce can "breathe." The net effect of this expedient is to permit the microclimate of the package to attain a composition equal to that of normal atmosphere containing approximately 21 percent oxygen and 79 percent nitrogen.

The present invention solves the problem of providing a film of certain characteristics which is utilized as an inside sealed package, and a film of entirely different permeability characteristics which is utilized as an outside package, both cooperating to enclose a free gas space. By this means most fruits and vegetables can be provided in an ideal state of suspended respiration since, upon reaching an equilibrium relative to the levels of nitrogen, carbon dioxide, and oxygen content within the inner package, this equilibrium can be maintained for a considerable length of time.

It has been found that suitable films for use as the inside sealed package are those transparent films in which the ratio of carbon dioxide permeability to oxygen permeability, on a volume basis, is at least 3:1, and preferably 4:1 or more. Although many methods of measurement of gas permeability have been proposed, the method of Davis, *Paper Trade Journal*, Aug. 29, 1946, is preferred. In this method the gases on opposite sides of a film are maintained at equal pressure, approaching the conditions of a finished package. Another method, using a differential in gas pressure, is that of Landrock and Proctor, TAPPI, Vol. 35, No. 6, June 1952. Comparison of results attained by the two methods have shown that the ratios of permeability of carbon dioxide to oxygen are substantially the same, although the net values may differ somewhat. Film materials suitable for use as the inner film are polyvinyl chloride, nylon (polyamide), Parafilm (rubber-wax oriented film), Pliofilm (rubber hydrochloride type), polyethylene, polystyrene, and polypropylene. All of these films have a carbon dioxide to oxygen permeability ratio of greater than 4.00, as indicated in table II below showing values obtained by both the Davis and the Landrock and Proctor methods.

TABLE II

| | $P\ CO_2/P\ O_2$ | |
|---|---|---|
| | Davis | Landrock & Proctor |
| 0.0016 polyvinyl chloride—50% Relative Humidity | 4.83 | 4.37 |
| Nylon 0.0018—50% Relative Humidity | 5.87 | — |
| Parafilm—75% Relative Humidity—21° C. | 4.58 | — |
| Pliofilm P2—75% Relative Humidity—8° C. | 4.85 | 4.32 |
| Polyethylene | 4.00 | 3.09 |
| Polystyrene | 5.16 | 4.96 |
| Polypropylene | — | 3.4 |

The outer film should have an oxygen permeability and carbon dioxide permeability of less than 0.25 of the oxygen permeability of the inner film. A favorable equilibrium gas balance is then attained which will greatly extend the shelf life of fruits and produce. For the outside film it is preferred to use films which have an oxygen permeability not in excess of 30 cc. of oxygen per square meter per 24 hours as tested by the Davis method above named. Saran film, and films coated with Saran, perform ideally in this respect. For example, it is possible to use polyethylene for the film of the inner sealed package, and to use Saran-coated polyethylene for the film of the outer sealed package. The term "Saran" is presently used generically in the art and refers to polyvinylidene chloride and films of copolymers of a major proportion of vinylidene chloride and a minor proportion of such materials as vinyl chloride or acrylonitrile. Alternatively, polyvinyl alcohol films or wax-coated films may be used in some applications.

A further tabulation of films suitable for the practice of the present invention and their oxygen and carbon dioxide permeabilities at 25° C. are presented in table III below.

TABLE III

| | Permeability, cc./100 in.²/24 hrs. | |
|---|---|---|
| Film type | Oxygen | Carbon dioxide |
| Low-density PE (2 mil) | 250–275 | 700–1,300 |
| "Mylar" (50 gauge)-Low-density PE (2 mil) (Lamination) | <1 | <2 |
| PVDC-coated nylon (1 mil)-Low-density PE (2 mil) (Lamination) | <1 | <5 |
| PVC (1½ mil) | <35 | 100 |
| PVA (1 mil) | <1 | <1 |
| Polypropylene | 320 | 1,000 |
| Waxed sheet [1] | <1 | <5 |
| Saran coated cellophane—PE (Lamination) | 1 | <1 |
| "Saran" | <2 | 5–15 |

[1] 31 pounds of waterleaf coated with 90 pounds of a mixture containing 65 weight percent paraffin, 5 weight percent polyethylene, and 30 weight percent amorphous polypropylene blend "Mylar"—polyvinylidene chloride coated polyester; "Saran"—polymer of vinylidene chloride or copolymer of vinylidene chloride with vinyl chloride or acrylonitrile.

NOTE: PE—polyethylene; PVDC—polyvinylidene chloride; PVC—polyvinyl chloride; PVA—polyvinyl alcohol.

In some cases it is sufficient to provide the space between the inside and outside sealed film packages with a gaseous atmosphere containing oxygen in an amount less than about 15 percent by volume, but in other instances, where a very low relative amount of oxygen in the atmosphere is required within the inner package, it is desirable to dilute the outer gas with nitrogen, inert gas, or even with carbon dioxide even further. Since permeation from the outer atmosphere to the inner atmosphere is concentration dependent, after a period of time an equilibrium or near equilibrium will be reached. This equilibrium will then be controlled only by ingress or egress of oxygen or carbon dioxide through the outer film. Since this is much lower in rate than for the inside film considering both carbon dioxide and oxygen, an improved balance is obtained. In some instances it is desirable to remove all the gas from the inner atmosphere and to depend upon the inner film to supply the necessary balance by ingress of oxygen. In such cases the inner package can be evacuated before sealing to remove the free-gas space, and then to seal the outer package containing an atmosphere of a reduced oxygen content around the first package. Alternatively, the inner package can be flushed with nitrogen. Under these conditions it has been found that an equilibrium oxygen content in the inner atmosphere will attain a value of about 4 percent by volume for extended periods, an ideal value for most fruits and vegetables. Thus an oxygen concentration in the gaseous atmosphere between the inner and outer pouches of less than about 4 percent by volume is preferred.

During storage, the inner bag may contract about the produce, while the outer bag may expand, providing a volume adjustment in addition to concentration adjustment. In some instances, however, the inner bag may expand while the outer bag contracts. In any case, a suitable composition equilibrium is reached.

There are many perishable items of fruit and produce which require refrigeration, whether packaged or not, to keep well enough for retail distribution. The following examples illustrate the improvement obtained with the present invention in keeping some of these items even without refrigeration. All gas concentrations reported below are by volume.

Example 1: Sour Red Cherries, Preservation

Mature red cherries were purchased and divided into several portions of equal quality. Paperboard trays of 5×7 inches cross section were filled with the cherries. In one case filled trays were wrapped with polyethylene film 0.002 inches thick. A second set of trays were placed in a sealed polyethylene film pouch having the same properties as in the first instance, but in this case the polyethylene pouch was then enclosed in a larger pouch of laminated "Mylar"-polyethylene, the larger pouch flushed with 100% $CO_2$ and then hermetically sealed. A third set of trays was left exposed to room conditions in a tray without packaging, the conventional means of distribution.

After 2 days of storage the unprotected cherries were decayed and moldy. After 8 days the cherries in the polyethylene pouch alone were moldy and musty. The cherries in the double package of this invention, on the other hand, were in good condition after 8 days. Analysis of the gas contained inside the inner pouch, and between the inner and outer pouch, showed that each had a $CO_2$ content of about 59–62 percent, and an $O_2$ content of about 4 percent, thus indicating that an equilibrium favorable to preservation had been established.

Sour red cherries picked at maturity have a storage life of only 1 day at room temperature (70°–80° F.), and only 2 to 3 days under refrigeration.

Example 2: Preservation of Sweet Cherries

As in example 1, Michigan sweet cherries of the Bing variety were purchased on a local market and portions of 270 grams each packaged in trays contained in (a) a pouch of polyethylene only, (b) a pouch of polyethylene, with normal air enclosed, and this in turn inside a pouch of polyvinyl alcohol from which the air had been displaced by a gas mixture comprising about 70 percent air and about 30% $CO_2$, and (c)

a pouch of polyethylene containing air which, in turn, was enclosed in a sealed pouch of laminated "Mylar"-polyethylene from which the air had been displaced by a gas mixture comprising about 70 percent air and about 30% $CO_2$.

After 7 days of storage at 73° F. and 50 percent relative humidity the cherries in packages (a) were badly molded and fermented; the cherries of packages (b) appeared to be in good condition; and the cherries of packages (c) were also good. Trays of unprotected fruit spoiled in 2 days.

Gas analysis at the end of the test showed that the atmosphere inside the polyethylene pouch of (a) had been depleted of $O_2$ (about 0.3% $O_2$ remaining) and the $CO_2$ content had built up to about 7 percent. The atmosphere in the inner and outer pouches of (b) contained an average of about 2.25% $O_2$ and about 56.5% $CO_2$, respectively. The atmosphere of the inner and outer pouches of (c) contained an average of about 5.5% $O_2$ and about 64% $CO_2$, and about 4% $O_2$ and about 59% $CO_2$ respectively—a favorable equilibrium.

Sweet cherries of the Bing variety are ordinarily kept under refrigeration, and if wrapped, held for only 1 or 2 days.

Example 3: Preservation of Bananas

Hands of two bananas each (about 500 grams) were placed in paperboard trays and enclosed in film combinations of (a) pouch of "Mylar"-polyethylene from which as much air as possible had been displaced by a mixture of about 15% $CO_2$ and about 85% $N_2$; (b) an inner pouch of polyvinyl chloride from which as much air as possible had been displaced by a mixture of about 10 percent air and about 90% $N_2$ which, in turn, was sealed into a pouch of laminated "Mylar"-polyethylene containing gas composed of about 15% $CO_2$ and about 85% $N_2$; (c) same as (b) except polyethylene was used as the inner film; and (d) bananas in trays only.

At the end of 8 days of storage at 73° F. and 50 percent relative humidity bananas in packages (a) were very soft and decayed with considerable stem rot; the bananas in pouches (b) were fully ripe but the skins were of bright yellow and the fruit firm and tasteful; however when the fruit was removed from the package it spoiled within 1 day. Bananas in pouches (c) were almost as good as packages (b) and greatly superior to packages (a), and bananas stored only in trays became overripe in 3 to 4 days and were unmarketable.

Bananas, when ripe, cannot ordinarily be held at room temperature (70°–76° F.) for more than 3 to 4 days before usage. Also, bananas cannot be stored at temperatures less than about 55° F. without danger to the enzyme systems of the skin of the fruit, thus turning the skin dark brown to black and rendering the fruit unusable; however, using the package of this invention, ripe bananas can be held at room temperature for at least 8 days as shown by the above package tests.

Example 4: Preservation of Avocados

Preclimacteric avocados were packaged under controlled atmospheres as follows: packages of one avocado each in paperboard trays containing the fruit were enclosed in: (a) a sealed pouch of polyvinyl chloride film from which as much air as possible had been displaced by a gas mixture of about 10 percent air and about 90% $N_2$, which, in turn, was sealed in a laminated "Mylar"-polyethylene pouch containing a mixture of about 10% $CO_2$ and about 90% $N_2$; (b) a sealed pouch of polyethylene containing an atmosphere of 100% $N_2$ which, in turn, was sealed in a pouch of "Mylar"-polyethylene containing 100% $N_2$; (c) a sealed pouch of polyvinyl chloride film containing 100% $N_2$ which, in turn, was sealed in a "Mylar"-polyethylene pouch containing 100% $N_2$; (d) same as (c) except the inner pouch was polyethylene; (e) the fruit was sealed in a polyethylene pouch containing 100% $N_2$ and no outer pouch was used; and (f) in a paperboard tray without any film protection.

After 10 days of storage at 73° F. and 50 percent relative humidity fruit in package (a) was slightly soft but had excellent taste and was considered at an ideal stage of development. After 7 days of storage, fruit in package (b) was in essentially the same condition as (a) at 10 days; after 7 days of storage (c) and (d) were equivalent to (b). The inner atmosphere of packages (a), (b), (c), and (d) ranged in $CO_2$ content of from about 25 to about 35 percent and the $O_2$ content from 0 to about 1 percent. In these cases the gas composition of the outer atmosphere was substantially in equilibrium with the inner atmosphere.

Fruit in packages (e) after 7 days was soft and moldy, had a poor taste, and was surrounded by an atmosphere of only about 13% $CO_2$ and about 2% $O_2$.

Fruit in packages (f) was fully ripe at 2 days and spoiled in 4 days.

Inasmuch as avocados are a subtropical fruit characterized by rapid changes in respiration through the preclimacteric, climacteric, and senescent stages, they have never before been successfully packaged, and must be held under refrigeration during shipping and distribution. Thus the present preservation method represents a substantial advance in the art by materially extending storage life at ambient temperatures.

Example 5: Preservation of Strawberries

California strawberries were obtained from a broker at a ripening stage when some green spots were still apparent. Three hundred grams were placed in a series of paperboard trays and packaged as follows: (a) in an inner sealed pouch of polyethylene from which as much air as possible had been replaced with 100% $N_2$, which, in turn, was enclosed in a sealed pouch of laminated "Mylar"-polyethylene containing a gas atmosphere composed of about 30% $CO_2$ and about 70% $N_2$; (b) in the same film combination as (a) but the outer pouch containing 100% $N_2$; (c) in an inner sealed pouch of polyethylene containing air and this in turn enclosed in a "-Mylar"-polyethylene pouch containing air; and (d) in open air.

Berries in (a) did not spoil until after 7 days of storage at 73° F. and 50 head of percent relative humidity; berries in (b) did not spoil until after 6 days; berries in (c) were 2, at 4 to 5 days; and berries in open air (d) 30 percent 3 days. The average $O_2$; content of the inner atmosphere of (a) 100 percent at the conclusion of the test was 0 to about 1 percent and the $CO_2$ content was about 40–70 percent. The $O_2$ of the inner atmosphere of (c) was about 4 percent.

Example 6: Preservation of California Lettuce

Fresh, iced California lettuce which had been shipped under refrigeration was obtained from a broker. Trays of paperboard were each loaded with one-half head of this lettuce and packaged as follows: (a) sealed in an inner pouch of polyethylene containing 100% $N_2$, which, in turn, was sealed in a "Mylar"-polyethylene pouch containing about 30 percent air and about 70% $N_2$, (b) sealed in a polyethylene pouch containing 100 percent air (conventional packaging); and (c) in open air.

After 7 days of storage at 73° F. and 50 percent relative humidity, sample (a) had a very good appearance, taste, and odor and was surrounded by an equilibrium atmosphere containing no $O_2$ and about 26% $CO_2$. Sample (b) showed rust and rot, and a brown butt and was surrounded by an equilibrium atmosphere of only about 6% $CO_2$, indicating that $O_2$ was entering and $CO_2$ leaving the package too fast to provide an equilibrium favorable to the produce. Sample (c) was badly dehydrated and browned at the end of 3 days storage.

Previous examples 1 through 6 show the benefits of this invention in extending the storage life of perishable fruits and vegetables. The packaging and method of this invention are equally applicable to other fruits and vegetables such as grapes, plums, peaches, string beans, peas, asparagus, cauliflower, blueberries, nectarines, etc., and allows such products to be harvested and shipped at a better stage of maturity, with or without refrigeration. The following examples show the benefit obtained at lower temperatures, namely 38° F.

Example 7: Preservation of Avocados at 38° F.

Preclimacteric avocados were obtained from a broker and one each were placed in paperboard trays and packaged as follows; (a) sealed in a polyethylene pouch containing an atmosphere of about 25% $CO_2$, about 10 percent air, and about 65% $N_2$, which, in turn, was sealed in a "Mylar"-polyethylene pouch containing an atmosphere of about 26% $CO_2$ and about 74% $N_2$; and (b) in open air. The packaged fruit were then stored at about 38° F.

Fruit in packages (a) were soft but otherwise good and flavorable after 20 days of storage. The inner and outer atmospheres were found to be in equilibrium at 0 to about 1% $O_2$ and about 33–35%, $CO_2$, but fruit in packages (b) spoiled in 7 days and was unedible.

Example 8: Preservation of Lettuce at 38° F.

Half heads of California lettuce were placed in a series of paperboard trays and packaged as follows: (a) sealed in polyethylene pouch containing an atmosphere of about 26% $CO_2$ and about 74% $N_2$, which, in turn, was sealed in a "-Mylar"-polyethylene pouch containing the same gas mixture; (b) sealed in a polyethylene pouch with the gas mixture of (a); (c) sealed in a polyethylene pouch with perforations; and (d) in open air.

Lettuce in packages (a) showed only a very slight leaf browning, no rot, no brown butt, and possessed excellent crispness and taste after 20 days of storage. Lettuce in packages (b) showed browning and drying and had lost its crispness in 20 days. Lettuce in packages (c) was dried up, brown, and spoiled in 14 days. Lettuce in packages (d) was dried up and brown in 7 days and unmarketable.

Results equal to (a) are obtained in inner pouches of PVC, polystyrene, pliofilm, rubber-wax films and others having a $CO_2/O_2$ permeation ratio of about 4:1 or greater. Low-permeability films suitable for the outside pouch are combinations of films, or coated films such as Nylon-PE, Saran-coated polyethylene or polypropylene, wax-coated or laminated films, Saran-coated cellophanes, and the like, all having both an $O_2$ and $CO_2$ permeability of one-fourth or less of the $O_2$ permeability of the inner film.

Example 9: Preservation of Lettuce

Trays of paperboard each were loaded with lettuce (about 200 to about 275 grams each) and packaged as follows: (a) sealed in an inner pouch of polyethylene containing 100 percent nitrogen which, in turn, was sealed in a "Mylar"-polyethylene outer pouch containing about 30 percent air and about 70 percent nitrogen; (b) sealed in an inner pouch of polyethylene containing air, which, in turn, was sealed in a "-Mylar"-polyethylene outer pouch containing air; and (c) in open air.

After 8 days of storage at 78° F. and 50 percent relative humidity lettuce packaged as in (a) was crisp, had very good taste and odor, and excellent appearance. Lettuce packaged as in (b) was spoiled, had a slimy appearance and a bad odor. Lettuce left in open air as in (c) had a slimy and rusty appearance after 5 days in storage.

This example clearly demonstrates the need for specific atmosphere control between the inner and the outer pouches of the produce package.

Example 10: Preservation of Bananas

Bananas (about 300 grams) were placed in paperboard trays and enclosed in an inner pouch of polyethylene containing about 10 percent air and about 90 percent nitrogen, which, in turn, was enclosed in a polyvinyl alcohol film outer pouch containing about 15% $CO_2$ and 85 percent nitrogen.

After 8 days of storage at 78° F. and 50 percent relative humidity the bananas had excellent appearance and good taste. Bananas stored in open air and under the same conditions became overripe in 3 days and had turned black after 8 days.

Example 11: Preservation of Avocados

Preclimacteric avocados weighing about 300 grams were placed in paperboard trays and packaged in (a) polyethylene inner pouch containing nitrogen, which, in turn, was placed in a "Mylar"-polyethylene outer pouch also containing nitrogen; (b) polyvinyl chloride inner pouch containing about 10 percent air and about 90 percent nitrogen; (c) polyethylene inner pouch containing air, which, in turn, was placed in a "Mylar"-polyethylene outer pouch also containing air; and (d) left in open air without any film protection. All of the foregoing were stored at 78° F. and 50 percent relative humidity.

After 17 days of storage avocados packaged as in (a) were of perfect ripeness, and had excellent appearance and taste.

After 14 days of storage avocados packaged as in (b) had good to excellent appearance and good taste, whereas avocados packaged as in (c) were soft, and had turned black and moldy.

After 16 days of storage avocados packaged as in (c) were very soft, had good appearance from the outside but looked poor in the inside.

Avocados stored in open air as in (d) became overripe and had turned black in 4 days.

The above example again demonstrates the criticality of an atmosphere having a reduced oxygen content in the outer pouch.

The foregoing discussion and the examples are intended as illustrative. Still other variations within the spirit and scope of the present invention will readily present themselves to one skilled in the art.

I claim:

1. A perishable plant food package comprising an inner film, defining an inner pouch enclosing said food, of a plastic sheet material having a carbon dioxide to oxygen permeability ratio of at least 3:1 and selected from the group consisting of polyvinyl chloride, nylon, and rubber hydrochloride; an outer film, enveloping said inner pouch, of a plastic sheet material having both a carbon dioxide permeability and an oxygen permeability no greater than about one-fourth of the oxygen permeability of the inner film; and a gaseous atmosphere having an oxygen content less than about 15 percent by volume enclosed between said films.

2. A package according to claim 1 wherein the concentration of oxygen in said gaseous atmosphere is less than about 4 percent by volume.

3. A package according to claim 1 wherein said inner film is polyvinyl chloride.

4. A package according to claim 1 wherein said inner film is nylon.

5. A package according to claim 1 wherein said inner film is rubber hydrochloride.

6. A package according to claim 1 wherein said outer film is polyvinylidene chloride.

7. A package according to claim 1 wherein said outer film is polyethylene having a coating of polyvinylidene chloride thereon.

8. A perishable plant food package comprising an inner film, defining an inner pouch enclosing said food, of a plastic sheet material having a carbon dioxide to oxygen permeability ratio of at least 3:1 an outer film which is polyvinyl alcohol enveloping said inner pouch and having both a carbon dioxide permeability and an oxygen permeability no greater than about one-fourth of the oxygen permeability of the inner film; and a gaseous atmosphere having an oxygen content less than about 15 percent by volume enclosed between said films.

9. A package according to claim 8 wherein said inner film is polyethylene and said outer film is polyvinyl alcohol.

10. A package according to claim 8 wherein the inner film has a carbon dioxide to oxygen permeability ratio of at least 4:1.

11. A method of packaging perishable plant foods which includes the steps of:

inserting said food into an inner pouch of a plastic sheet material having a carbon dioxide to oxygen permeability ratio of at least about 3:1;

sealing said inner pouch;

inserting said sealed pouch into an outer enclosure of a synthetic plastic material having both a carbon dioxide permeability and an oxygen permeability no greater than about one-fourth of the oxygen permeability of the inner pouch;

surrounding said inner pouch with a gaseous atmosphere having an oxygen content less than about 15 percent by volume; and hermetically sealing said outer enclosure.

12. The method in accordance with claim 11 wherein said gaseous atmosphere contains less than about 4 percent oxygen.

13. The method in accordance with claim 11 wherein the inner pouch is flushed with nitrogen prior to sealing.

14. The method in accordance with claim 11 wherein the inner pouch is evacuated prior to sealing.

* * * * *

UNITED STATES PATENT OFFICE
CERTIFICATE OF CORRECTION

Patent No. 3,630,759                    Dated 28 December 1971

Inventor(s)  G. G. Rumberger

It is certified that error appears in the above-identified patent and that said Letters Patent are hereby corrected as shown below:

| | |
|---|---|
| Col. 1, line 32<br>Page 2, line 2 | "stores"<br>-- stored -- |
| Col. 3, line 20 (Table II)<br>Page 5, line 25 | "C. 4.85"<br>-- C. --<br>insert -- 4.85 -- as 4th item under column headed "Davis" |
| Col. 6, line 38<br>Page 12, line 11 | "50 head of percent"<br>-- 50 percent -- |
| Col. 6, line 39<br>Page 12, line 12 | "berries in (c) were 2"<br>-- berries in (c) were rotten and moldy -- |
| Col. 6, line 40<br>Page 12, line 13 | "(d) 30 percent 3 days"<br>-- (d) spoiled in three days -- |
| Col. 6, line 41<br>Page 12, lines 14-15 | "(a) 100 percent"<br>-- (a) and (b) -- |
| Col. 6, line 43<br>Page 12, line 17 | "The $O_2$ of the..."<br>-- The $O_2$ content of the...-- |
| Col. 7, line 15<br>Page 13, line 25 | "unedible"<br>"unedible"   -- inedible -- |
| Col. 8, line 63, Claim 8<br>Claim 12,(Amended 4/13/71)<br>line 4 | "3:1"<br>-- 3:1, -- |

Signed and sealed this 27th day of June 1972.

(SEAL)
Attest:

EDWARD M. FLETCHER, JR.　　　　　ROBERT GOTTSCHALK
Attesting Officer　　　　　　　　　Commissioner of Patents